(12) United States Patent
Thompson et al.

(10) Patent No.: US 11,660,655 B2
(45) Date of Patent: May 30, 2023

(54) HYDRAULIC CRIMP PRESSURE FEEDBACK METHODS

(71) Applicant: ContiTech USA, Inc., Fairlawn, OH (US)

(72) Inventors: Scott Thompson, Chicago, IL (US); Cameron Banga, Valparaiso, IN (US); Joseph Vicente Intagliata, Hanna, IN (US)

(73) Assignee: ContiTech USA, Inc., Fairlawn, OH (US)

( * ) Notice: Subject to any disclaimer, the term of this patent is extended or adjusted under 35 U.S.C. 154(b) by 3 days.

(21) Appl. No.: 16/598,035

(22) Filed: Oct. 10, 2019

(65) Prior Publication Data

US 2020/0114413 A1   Apr. 16, 2020

Related U.S. Application Data

(60) Provisional application No. 62/743,760, filed on Oct. 10, 2018.

(51) Int. Cl.
*B21D 39/04* (2006.01)
*F16L 13/14* (2006.01)
*F16L 13/12* (2006.01)
*B21D 41/04* (2006.01)

(52) U.S. Cl.
CPC ......... *B21D 39/048* (2013.01); *B21D 39/046* (2013.01); *B21D 39/04* (2013.01); *B21D 41/04* (2013.01); *F16L 13/128* (2013.01); *F16L 13/141* (2013.01); *F16L 2013/145* (2013.01); *Y10T 29/53039* (2015.01); *Y10T 29/53061* (2015.01); *Y10T 29/53087* (2015.01)

(58) Field of Classification Search
CPC .... B21D 39/04; B21D 39/046; B21D 39/048; B21D 41/04; F16L 13/141; F16L 2013/145; Y10T 29/53039; Y10T 29/53087; Y10T 29/53061; Y10T 29/49776
See application file for complete search history.

(56) References Cited

U.S. PATENT DOCUMENTS

| | | | |
|---|---|---|---|
| 2004/0122619 A1* | 6/2004 | Malone | F16L 13/141 702/182 |
| 2005/0016235 A1* | 1/2005 | Zusi | G05B 19/128 72/15.1 |
| 2012/0137486 A1* | 6/2012 | Charlton | H01R 43/0486 29/407.01 |
| 2013/0160284 A1* | 6/2013 | Gatz | B21D 39/048 29/715 |
| 2018/0131151 A1* | 5/2018 | Chahrour | B21D 39/048 |

FOREIGN PATENT DOCUMENTS

WO   WO-2010120373 A2 *  10/2010  ......... H01R 43/0486

* cited by examiner

*Primary Examiner* — Jermie E Cozart
(74) *Attorney, Agent, or Firm* — Gregory Adams; David L. Cate

(57) ABSTRACT

A crimping system for crimping fittings on hoses is disclosed and include an interface and a crimper machine. The crimper machine is configured to analyze collected information based on identified hose and fitting properties; perform a crimping operation based on the collected information and the identified hose and fitting properties; measure crimping characteristics for the crimping operation; generate an alert based on the measured crimping characteristics and the collected information; and provide the alert to the interface.

12 Claims, 2 Drawing Sheets

HYDRAULIC CRIMP PRESSURE FEEDBACK METHODS

RELATED APPLICATIONS

This application claims the benefit of provisional application 62/743,760, filed Oct. 10, 2018.

FIELD

The field to which the disclosure generally relates is hydraulic hose assembly manufacture methods and apparatus, and in particular using hydraulic crimp pressure data feedback to improve accuracy of the initial crimp or even detect potential crimp anomalies.

BACKGROUND

Hydraulic hoses convey hydraulic fluid to hydraulic systems, components and parts. Hydraulic systems utilize the hydraulic fluid at high pressure to operate and control their various components.

DRAWINGS

DETAILED DESCRIPTION

Figure 1:
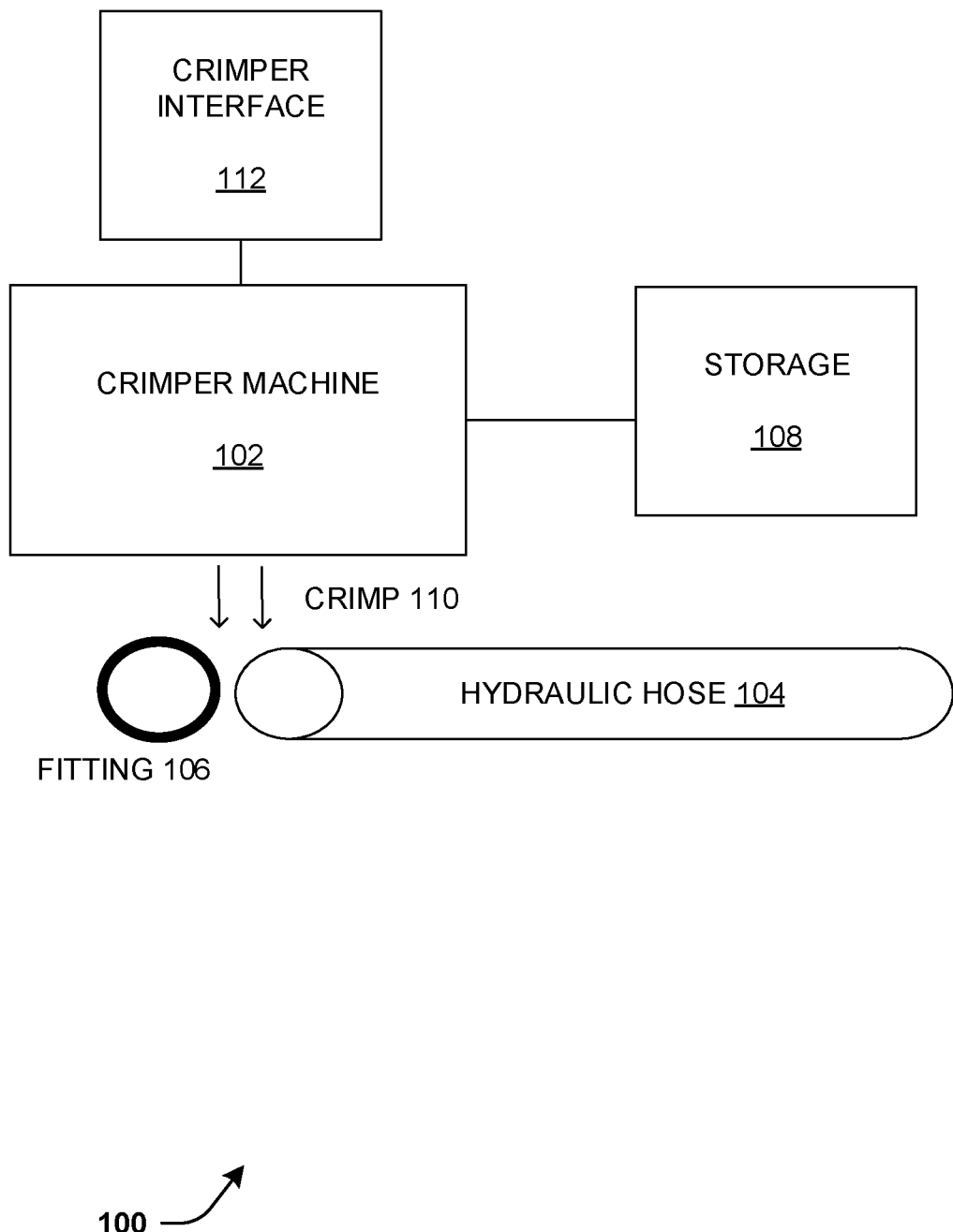
FIG. 1 is a diagram illustrating a crimping system in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are significantly more than an abstract idea(s), but rather are methods and apparatus utilizing a plurality of devices and data to form crimps for fittings secured with hoses.

Some embodiments according to the disclosure include at least a hose, one or more fittings, one or computing devices, crimping pressure data, and one or more crimping machine(s) to provide hydraulic crimp with improved the accuracy of the initial crimp. Hydraulic fittings must be crimped to a specific crimp diameter in order to ensure that they will operator properly. These crimp diameters are specified by the hose and fitting manufacturing and the crimper can be configured to crimp to this target crimp diameter.

The initial crimp is often inaccurate due to a number of factors, such as spring back from the hose and fitting, wear and tear on the dies and crimper, as well as manufacturing tolerances of the hose and fitting.

Embodiments according to the disclosure use the initial crimp target (set based on the manufacturer's specification) and pressure to determine the probability that the crimp has been crimped to the target diameter. The crimper will iterate through multiple cycles, varying the crimper setting automatically and using the pressure feedback to increase the probability that the crimp is accurate. This is in contrast to the procedures where hose and fitting manufacturers recommend that users measure crimps to ensure accuracy, which involves removing the hose assembly from the crimper, measuring, reinserting and re-crimping (potentially multiple times) which is a time consuming process. Hence, some embodiments according to will reduce the time to get an accurate crimp.

In some aspects, an algorithm is written in the software of the crimper to cycle the crimping until the algorithm determines the crimp accuracy probability is high enough. Further, tracking the difference between the initial target and the calculated accurate target could provide several other benefits, such as providing an indication of the wear and tear of the machine, providing an indication of the manufacturing consistency of the hose and fitting products, or even providing an indication of the typical spring back of the hose and fitting components.

Some other embodiments according to the disclosure include at least a hose, one or more fittings, one or computing devices, crimping pressure data, and one or more crimping machine(s) to detect incorrectly manufactured hydraulic hose assemblies during the crimping process. The embodiments use information collected from previous hose assembly manufacturing to determine when the crimping force needed to complete the crimp is outside of expected parameters. The operator may be notified about the exception so that an immediate inspection of the hose assembly can be performed.

The collected information may take into account the individual machine that is performing the crimp, the die set used in the crimping process, the hose type and size used in the hose assembly, or even the fitting type and sized used in the hose assembly.

Detecting crimping force anomalies at the time of manufacture may allow the operator to verify the quality of the crimped fitting on the hose assembly. Also, detecting quality issues at the time of manufacture may reduce the chances of an improperly manufactured hose assembly will be placed into production. In addition, catching quality issues early may reduce any downstream expenditures into the hose assembly.

According to the disclosure, hose assembly manufacturing data will collected. This data will then be broken down by hose, fitting, hose size, crimping equipment and die set. Once broken down, the data can be analyzed to determine the normal expected range of crimping pressures used for a specific combination of hose, fitting, size, die and crimper. With the expected operating range, crimping machines can detect crimps outside of this range and inform the operator so that they can investigate for potential: cracked fitting, improper insertion, or incorrect components. Crimping pressure analysis may also provide insight into the maintenance status of a crimper and could direct an operator to perform maintenance or request machine servicing.

Methods according to the disclosure may be carried out at one location, or a plurality of locations. The methods may utilize at least a hose, one or more fittings; one or computing devices or the like, crimping pressure data, and one or more crimping machines. The various devices involved in data communicating, evaluating, collecting, etc. may be connected by any suitable method/apparatus, such as, Bluetooth, WIFI, hard wired, cellular communication, satellite communication, and the like, or any combination thereof.

The above description applies to the embodiments described below.

FIG. 1 is a diagram illustrating a crimping system 100 in accordance with one or more embodiments. The system 100 is provided for illustrative purposes and it is appreciated that suitable variations are contemplated.

The system 100 includes a crimper interface 112, a crimper machine 102 and storage 108. The system 100 operates on hydraulic hoses to crimp and/or connect hydraulic fittings to the hydraulic hoses.

For illustrative purposes, the system 100 is shown operating on a hydraulic hose 104 and a hydraulic fitting 106.

The storage 108 is configured to store and/or maintain collected information. The storage 108 comprises a suitable storage media, such as volatile memory, non-volatile memory, cloud storage and the like. The collected information can include crimper machine identification and properties; one or more dies usable for crimping; hoses and hose types; fitting and fitting types, and the like.

The collected information can be provided to and updated by the crimper machine 102.

The crimper machine 102 is configured to perform crimping operations and the like on hydraulic hoses. Generally, the crimper machine 102 identifies hose and fitting properties for the hose 104 and fitting 106, analyzes collected information based on the identified hose and fitting properties to obtain a crimping force and the like, performs crimping of the hose 104 and generates measured crimping characteristics, and analyzes the measured crimping characteristics, and can generate alerts and the like using the crimper interface 112.

The hose and fitting properties can include material, size, and the like.

The crimping information includes a crimping force or range of force used for crimping, one or more crimping dies that can be used and the like. The crimping force or force range can also be referred to as a target force range.

During the crimping operation, one or more sensors of or associated with the machine 102 measures the force applied and generates force measurements, which can be provided to the crimper machine 102 as generated measured crimping characteristics. It is appreciated that the crimping characteristics can include other information related to the crimping operation such as duration, and the like.

In one example, the one or more sensors include a strain gauge.

The crimper machine 102 can include circuitry, logic and the like configured to perform various functionality, including at least portions of the below method.

The crimper machine 102 analyzes the generated measured crimping characteristics and the crimping information to determine the results of the crimping. In one example, the crimper machine 102 compares the crimping force with a range of forces to determine if the crimping force falls outside the range. In this example, an alert is provided to the crimper interface 112 that the crimping was performed outside of the range of crimping forces. The alert can then be sounded or displayed by another device.

The determined results can include, for example, a successful crimp with a crimping force range, an under force crimping below the force of the obtained crimping information and the like, an over force crimping above the force of the obtained crimping information. It is appreciated that other determined results are contemplated.

The determined results can also identify crimping force anomalies at the time of manufacture and allow verification of the crimped hose to be performed to determine the presence of a quality issue of the crimping. The identified anomalies and/or verification mitigates the occurrence of improperly manufactured hose assemblies. It is appreciated that the identified anomalies can be due to cracked fitting, improper insertion, incorrect components and the like. Further, the determined results can also be used to estimate a maintenance status of a crimper machine and could predict or identify servicing.

The crimping force can also be referred to as crimping pressure.

The system 100 can include or utilize at least a hose, one or more fittings, one or computing devices, crimping pressure data, and one or more crimping machine(s) to provide hydraulic crimp with improved the accuracy of the initial crimp. Hydraulic fittings are typically crimped to a specific crimp diameter in order to ensure that they will operate properly. These crimp diameters are specified by the hose and fitting manufacturing and the crimper can be configured to crimp to this target crimp diameter.

The initial crimp is often inaccurate due to a number of factors, such as spring back from the hose and fitting, wear and tear on the dies and crimper, as well as manufacturing tolerances of the hose and fitting.

The collected information can include categories such as fitting, hose size, crimping equipment, die set and the like. The categories can be used to determine expected range of crimping pressures for combinations of hose, fitting size, die, crimper and the like.

Crimping operations (measured crimping characteristics) can be identified that occur outside the expected range.

The crimper machine 102 can also modify and/or update the crimping information in the storage 108.

The system 100 can perform additional crimping operations and the like.

Figure 2:
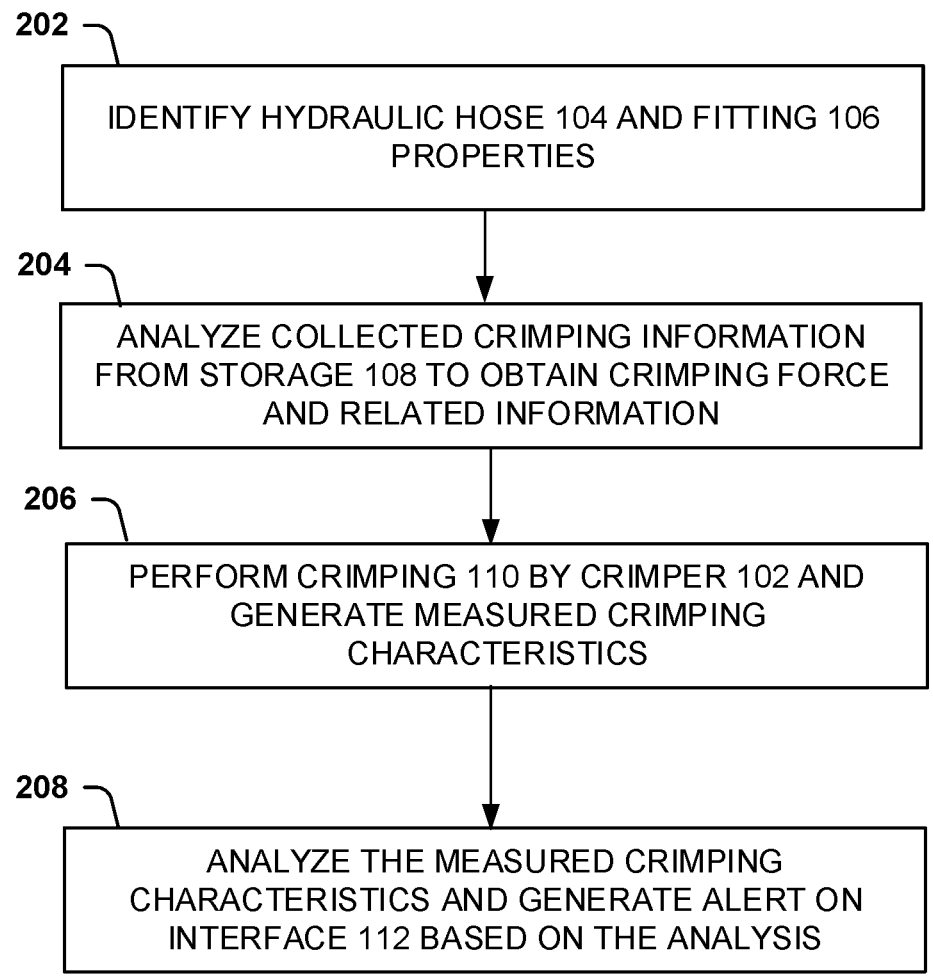
FIG. 2 is a flow diagram illustrating a method of performing crimping in accordance with one or more embodiments.

FIG. 2 is a flow diagram illustrating a method 200 of performing crimping in accordance with one or more embodiments. The method 200 is provided for illustrative purposes and it is appreciated that suitable variations are contemplated.

The method 200 can be performed using the system 100 and/or additional aspects and embodiments described herein. It is appreciated that elements or blocks of the method 200 can be performed in other suitable orders. Further, it is appreciated that blocks can be omitted and other blocks or functions performed that are not shown.

The method 200 begins at block 202, where a crimper machine 102 identifies crimping properties for a hydraulic hose and fitting.

The crimper machine 102 analyzes collected crimping information at block 204 to obtain a crimping force and other crimping information based on the identified crimping properties for the hose and fitting. The crimper machine 102 can obtain the collected crimping information from the storage 108.

The crimper machine 102 performs crimping of the fitting onto the hose at block 206 based on the obtained crimping force. The crimper machine also generates measured crimping characteristics, which includes a used crimping force.

The crimper machine 102 analyzes the measured crimping characteristics at block 208. The crimper machine 102 can also generate alerts based on the measured crimping characteristics and the identified crimping properties.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A crimping system for crimping fittings on hoses, the system comprising:
    an interface having an audio device and a video display;
    one or more sensors including a strain gauge and the strain gauge configured to measure an applied crimping force for a crimping operation of a hose to a fitting;
    a crimper machine having a processor configured to analyze collected information based on identified hose and fitting properties; perform the crimping operation based on the collected information and the identified hose and fitting properties; measure crimping characteristics for the crimping operation; generate an alert based on the measured crimping characteristics and the collected information; and provide the alert to the interface;
    the processor of the crimper machine further configured to detect an inaccurate crimp from measurements of the one or more sensors and the measured crimping characteristics due to spring back from the hose and the fitting;
    a storage configured to maintain the collected information and update the collected information based on the measured crimping characteristics; and
    the measured crimping characteristics comprising force applied, applied force measurements, and crimping duration.

2. The system of claim 1, wherein the crimper machine is configured to obtain the identified hose and fitting properties based on a hydraulic hose.

3. The system of claim 1, wherein the collected information consists of fitting, hose size, crimping equipment, and die set.

4. The system of claim 1, wherein the crimper machine is configured to determine a crimping pressure for the crimping operation based on the identified hose and fitting properties and the collected information.

5. The system of claim 1, wherein the crimper machine is configured to analyze the measured crimping characteristics to determine if a used crimping force is within a determined crimping force range.

6. The system of claim 5, wherein the crimper machine is configured to generate the alert based on the used crimping force being outside the determined crimping force range.

7. The system of claim 1, the crimper machine is configured to initiate a crimp verification based on a determined result.

8. The system of claim 1, the crimper machine is configured to determine servicing and maintenance based on the measured crimping characteristics.

9. The system of claim 1, the crimper machine is configured to identify a potential cracking fitting and/or improper fitting insertion and/or improper die insertion based on the measured crimping characteristics and the collected information.

10. The system of claim 1, the crimper machine includes a selected die based on the collected information and the identified hose and fitting properties.

11. The system of claim 1, further comprising an external device configured to sound the alert.

12. The system of claim 1, further comprising an external device configured to display the alert.

* * * * *